United States Patent
Hayashi et al.

(10) Patent No.: US 6,234,601 B1
(45) Date of Patent: May 22, 2001

(54) INK JET RECORDING METHOD AND APPARATUS FOR FORMING AN IMAGE ON EITHER PLAIN PAPER OR A SPECIALTY RECORDING MEDIUM

(75) Inventors: Hiroko Hayashi; Masahiro Yatake; Yoshiyuki Ozawa; Masayuki Momose, all of Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/061,386

(22) Filed: Apr. 16, 1998

(30) Foreign Application Priority Data

Apr. 16, 1997 (JP) ......................................... 9-099485

(51) Int. Cl.$^7$ ................................. B41J 29/38; G01D 11/00; B41S 2/01
(52) U.S. Cl. ............................... 347/16; 347/100; 347/105
(58) Field of Search .................................. 347/14, 16, 43, 347/100, 105, 19

(56) References Cited

U.S. PATENT DOCUMENTS

| | | | | |
|---|---|---|---|---|
| 4,721,968 | * | 1/1988 | Arai et al. ............................. | 347/14 |
| 5,568,169 | * | 10/1996 | Dudek et al. ......................... | 347/43 |
| 5,570,118 | | 10/1996 | Rezanka et al. ...................... | 347/43 |
| 5,606,350 | * | 2/1997 | Koyama ................................ | 347/14 |
| 5,801,722 | * | 9/1998 | Ueda et al. ........................... | 347/16 |

FOREIGN PATENT DOCUMENTS

| | | |
|---|---|---|
| 0692386 | 1/1996 | (EP) . |
| 0703087 | 3/1996 | (EP) . |
| 0724968 | 8/1996 | (EP) . |
| 0753551 | 1/1997 | (EP) . |
| 02202965 | 8/1990 | (JP) . |

\* cited by examiner

Primary Examiner—John Barlow
Assistant Examiner—Juanita Stephens
(74) Attorney, Agent, or Firm—Ladas & Parry (57) ABSTRACT

An ink jet recording method which can produce a good image on both plain papers and specialty recording media for ink jet recording, and an ink jet recording apparatus for the ink jet recording method are disclosed. The ink jet recording method comprises: providing a black ink composition comprising a pigment as a colorant and a black ink composition comprising a dye as a colorant; and, when the recording medium comprises a gloss layer and/or an ink-receptive layer, printing only the black ink composition comprising a dye as the colorant on the recording medium, and, when the recording medium is plain paper, both the black ink composition comprising a pigment as the colorant and the black ink composition comprising a dye as the colorant are printed. According to this recording method, in the case of printing on plain paper, the density of black can be enhanced, while in the case of printing on a specialty paper for ink jet recording, an image having high chroma and good reproduction range can be produced.

20 Claims, 1 Drawing Sheet

FIG. 1

INK JET RECORDING METHOD AND APPARATUS FOR FORMING AN IMAGE ON EITHER PLAIN PAPER OR A SPECIALTY RECORDING MEDIUM

BACKGROUND OF THE INVENTION

1. Field of the Invention

The present invention relates to an ink jet recording method which can produce a high-quality printed image on plain papers and specialty recording media for ink jet recording, and an ink jet recording apparatus for the ink jet recording method.

2. Background Art

Ink jet recording is a method wherein an ink is ejected as a droplet through a fine nozzle to record letters or figures onto the surface of a recording medium. Ink jet recording systems which have been put to practical use include: a method wherein an electric signal is converted to a mechanical signal using an electrostrictive strain to intermittently eject an ink reservoired in a nozzle head section, thereby recording letters or symbols on the surface of a recording medium and a method wherein an ink, reservoired in a nozzle head section, in its portion very close to the ejection portion is rapidly heated to create a bubble and the ink is intermittently ejected by volume expansion created by the bubble to record letters or symbols on the surface of a recording medium.

Various properties are required of inks in the ink jet recording, and examples of such properties include fast drying of the printed image, freedom from feathering in the printed image, even printing on various recording media, freedom from color-to-color intermixing in the case of multi-color printing, and good waterfastness and lightfastness of the print.

What is further important in the ink jet recording is to realize a good image on various recording media. In particular, formation of a good image not only on a specialty recording medium optimized for ink jet recording but also on inexpensive, easily available plain paper has been desired in the art. In order to realize the formation of an image having good quality on plain paper, for example, Japanese Patent Laid-Open No. 41171/1991 proposes use of a black ink, which is less likely to penetrate a recording medium, and a color ink which easily penetrates the recording medium. Likewise, in order to realize the formation of an image having good quality on plain paper, Japanese Patent Laid-Open No. 128514/1994 proposes a recording method which comprises depositing a first liquid containing a water-soluble resin having in its molecule at least one carboxyl group or an anhydride thereof or a sulfone group onto a recording medium and then incorporating a dye-containing ink into the liquid-deposited area.

Further, various ink compositions using a pigment as the colorant have also been proposed in the art. Using the pigment as the colorant aims to realize a good image on plain papers. However, it has been found that realization of high quality on plain papers makes it difficult to realize a high-quality image on specialty papers for ink jet recording.

SUMMARY OF THE INVENTION

Accordingly, an object of the present invention is to provide an ink jet recording method which can produce a high-quality printed image on plain papers and specialty recording media for ink jet recording, and an ink jet recording apparatus for the ink jet recording method.

According to one aspect of the present invention, there is provided an ink jet recording method comprising the step of ejecting a droplet of an ink composition and depositing the droplet onto a recording medium to perform printing, wherein a black ink composition comprising a pigment as a colorant and a black ink composition comprising a dye as a colorant are provided; and when the recording medium comprises a gloss layer and/or an ink-receptive layer, only the black ink composition comprising a dye as the colorant is printed on the recording medium, while when the recording medium is plain paper, both the black ink composition comprising a pigment as the colorant and the black ink composition comprising a dye as the colorant are printed on the medium.

According to the ink jet recording method of the present invention, in the case of printing on plain paper, the density of black can be enhanced and, at the same time, high image quality free from bleeding between the black ink and a color ink can be produced, while in the case of printing on a recording medium comprising a gloss layer and/or an ink-receptive layer, an image having high chroma and good reproduction range can be produced.

DETAILED DESCRIPTION OF THE INVENTION

Definition

The term "plain paper" used herein refers to a broad set of commercial papers especially those available for use in electrographic copying that have not been produced with the intention of structures, compositions, or properties optimized for use in ink jet recording medium. Examples of such recording media include, for example, wood free papers and PPC papers.

Further, in the present invention, the "recording medium comprising a gloss layer and/or an ink-receptive layer" refers to a recording medium comprising a substrate having a layer composed mainly of a pigment and a binder, the layer having a capability of imparting a gloss to the recording medium or absorbing and fixing an ink composition. Pigments usable herein include colloidal silica, amorphous silica, colloidal alumina, boehmite, pseudo-boehmite, alumina, aluminum hydroxide, precipitated calcium carbonate, calcium bicarbonate, calcium sulfate, kaolin, talc, barium sulfate, rutile, zinc oxide, zinc sulfide, zinc carbonate, aluminum silicate, diatomaceous earth, calcium silicate, magnesium silicate, zeolite, halloysite, magnesium carbonate, and magnesium hydroxide. Binders usable herein include starch derivatives, carboxylmethyl cellulose (CMC), hydroxyethyl cellulose (HEC), casein, gelatin, polyvinyl alcohol, polyvinyl pyrrolidone, melamine resin, urea resin, urethane resin, unsaturated polyester resin, maleic anhydride resin, styrene-butadiene resin, and homopolymers or copolymers of acrylic acid derivatives and methacrylic acid derivatives. The pigment is mixed with the binder, and the mixture is coated onto a substrate, for example, paper or a resin sheet, to form a coating which is then dried to form the layer. In the case of the gloss layer, calendering, casting, and pressure contact drying using a heated specular surface wetted with an oil may be used for creating gloss. Alternatively, a glossy resin may be coated onto an ink-receptive layer to form a gloss layer.

Ink Composition

According to the ink jet recording method of the present invention, at least two black ink compositions are used Pigment-containing Ink Composition The first black ink composition comprises a pigment as a colorant. Inorganic pigments or organic pigments may be used without any particular limitation. Inorganic pigments usable herein include, in addition to titanium oxide and iron oxide, carbon blacks produced by known processes, such as contact, furnace, and thermal processes. Examples of the organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to a preferred embodiment of the present invention, the above pigment is preferably added, to the ink, in the form of a pigment dispersion prepared by dispersing the pigment in an aqueous medium with the aid of a dispersant or a surfactant. Preferred dispersants include those commonly used in the preparation of a dispersion of a pigment, for example, polymeric dispersants.

According to another preferred embodiment of the present invention, the pigment is dispersible and/or soluble in water without a dispersant. This pigment is one which has been treated so that at least one functional group, selected from carbonyl, carboxyl, hydroxyl, and sulfone groups, or a salt thereof is bonded to the surface of the pigment, thereby permitting the pigment to be dispersible and/or soluble in water without a dispersant. Specifically, this pigment can be prepared by grafting a functional group or a molecule containing a functional group onto the surface of carbon black by physical treatment, such as vacuum plasma, or chemical treatment (for example, oxidation with hypochlorous acid or sulfonic acid). In the present invention, a single type or a plurality of types of functional groups may be grafted onto one carbon black particle. The type of the functional group to be graf ted and the degree of graf ting may be suitably determined by taking the dispersion stability in the ink, the color density, the drying property at the front face of the ink jet head and the like into consideration.

In the present invention, when the pigment is stably present in water without any dispersant, this state is expressed as the state of "dispersion and/or dissolution." Not infrequently, it is difficult to distinguish the state of dissolution of a material from the state of dispersion of the material. In the present invention, any pigment can be used so far as the pigment is stably present in water without any dispersant independently of whether the pigment is in a dispersion form or a solution form. In the present specification, a pigment, which can stably exist in water without any dispersant is often referred to as a "water-soluble pigment." The water-soluble pigment in this case, however, does not exclude a pigment which is in-the state of dispersion in water.

The pigment, which is preferably used in the present invention, may be prepared, for example, by a method disclosed in Japanese Patent Laid-Open No 3498/1996. The carbon black treated by the method described in this publication has a high surface active hydrogen content of 1. 5 to 2.5 mmol/g and can be very easily dispersed in water. Further, the above pigment may be a commercially available one, and preferred examples thereof include Microjet CW1 or CW2 manufactured by Orient Chemical Industries, Ltd.

According to a preferred embodiment of the present invention, the pigment has an average particle diameter of 50 to 200 nm.

The amount of the pigment added may be determined so that satisfactory image density is realized. Preferably, however, it is about 0.5 to 15% by weight. In this amount range, the print density, the scratch resistance, and the drying to the touch are satisfactory, and, in addition, the long- and short-term clogging property, the storage stability and other properties are well balanced.

According to a preferred embodiment of the present invention, the pigment-containing ink composition further comprises glycerin. Addition of glycerin can effectively prevent the ink composition from drying at the front face of the nozzle of a recording head, thereby preventing the clogging of the nozzle. Although the amount of glycerin added may be suitably determined, it is preferably 1 to less than 20% by weight, more preferably about 3 to 15% by weight, from the viewpoint of the viscosity of the ink composition.

According to another preferred embodiment of the present invention, the pigment-containing ink composition further comprises 2-pyrrolidone. Addition of 2-pyrrolidone can effectively ensure short- and long-term stability against uneven printing and nozzle clogging. Although the amount of 2-pyrrolidone added may be suitably determined, it is preferably 1 to less than 20% by weight, more preferably about 3 to 10% by weight.

Further, according to a preferred embodiment of the present invention, the pigment-containing ink composition further comprises a polyhydric alcohol or a saccharide in order to prevent clogging of the nozzle caused by drying of the ink composition at the front face of the nozzle. Polyhydric alcohols usable herein include, for example, ethylene glycol, diethylene glycol, triethylene glycol, tetraethylene glycol, propylene glycol, dipropylene glycol, tripropylene glycol, polyethylene glycol having a molecular weight of not more than 2000, 1,3-propylene glycol, isopropylene glycol, isobutylene glycol, 1,4-butanediol, 1,3-butanediol, 1,5-pentanediol, 1,6-hexanediol, thiodiglycol, mesoerythritol, and pentaerythritol. Saccharides usable for this purpose include monosaccharides and polysaccharides. Specific examples thereof include glucose, mannose, fructose, ribose, xylose, arabinose, lactose, galactose, aldonic acid, glucitose, maltose, cellobiose, sucrose, trehalose, maltotriose, alginic acid and salts thereof, cyclodextrins, and celluloses. The amount of the polyhydric alcohol and the saccharide added may be property determined so that nozzle clogging can be effectively prevented. Preferably, however, it is about 0.05 to 10% by weight. Further, according to a preferred embodiment of the present invention, in the case of glucose, mannose, fructose, ribose, xylose, arabinose, lactose, galactose, aldonic acid, glucitose, maltose, cellobiose, sucrose, trehalose, and maltotriose, the amount thereof is more preferably about 3 to 10% by weight. Alginic acid and salts thereof, cyclodextrins, and celluloses, when added to the ink composition, are likely to increase the viscosity of the ink, and, hence, preferably, care should be taken so as to avoid addition of these compounds in an excessive amount.

According to a preferred embodiment of the present invention, the pigment-containing ink composition further comprises a water-soluble organic solvent. Examples of water-soluble organic solvents usable herein include: alkyl alcohols having 1 to 4 carbon atoms, such as ethanol, methanol, butanol, propanol, and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propylene glycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether; formamide; acetamide, dimethyl sulfoxide; sorbit; sorbitan; acetin; diacetin; triacetin; and sulfolane. These water-soluble organic solvents can advantageously improve the solubility of other ingredients into the ink composition, can improve the penetration of the ink composition into a recording medium, for example, paper, and, in addition, can effectively prevent clogging of the nozzle, and, hence, addition thereof is preferred. Although the amount of the organic solvent added may be properly determined, it is preferably about 0.1 to 60% by weight, more preferably about 5 to 15% by weight, based on the ink composition.

According to a preferred embodiment of the present invention, the pigment-containing ink composition further comprises triethanolamine. Addition of triethanolamine renders the ink composition alkaline to a proper extent and in addition has the effect of moisture retention to effectively prevent clogging of the nozzle. Although the amount of triethanolamine added may be properly determined, it is preferably about 0.5 to 3% by weight.

Preferably, the pH value of the pigment-containing ink composition of the present invention can be adjusted in the range of 7 to 11, more preferably 8 to 10. When the pH value is in this range, the pigment and, in addition, the resin emulsion described below can advantageously be allowed to stably exist in the ink composition. The pH value can be adjusted by addition of triethanolamine described above or a suitable alkali (for example, an organic alkali, such as ammonia, or an alkali metal salt). Preferred alkalis include potassium hydroxide. Adjustment of the pH value by a combination of triethanolamine with potassium hydroxide is particularly preferred. In the case of the combination of triethanolamine with potassium hydroxide, the amount of potassium hydroxide added is preferably about 0.01 to 0.2% by weight.

According to a preferred embodiment of the present invention, the pigment-containing ink composition contains a water-soluble emulsion. Addition of the water-soluble emulsion can improve the fixation and the scratch resistance of the resultant print. Preferably, the water-soluble emulsion comprises a continuous phase of water and a dispersed phase of acrylic resin, methacrylic resin, styrene resin, urethane resin, acrylamide resin, or epoxy resin or a mixture of these resins. Particularly preferred is a water-soluble emulsion wherein the dispersed phase comprises a resin composed mainly of acrylic acid and/or methacrylic acid. The resin is not limited by polymerization methods and may be, for example, a block copolymer, a random copolymer or the like. Further, preferably, the water-soluble emulsion used in the ink composition of the present invention has a film forming property and has a lowest possible film forming temperature of preferably room temperature or below, more Preferably 0 to 20° C.

According to a preferred embodiment of the present invention, the resin component of the water-soluble emulsion is a resin particle having a core/shell structure comprising a core surrounded by a shell. For example, the resin particle may be constructed so that a resin component capable of improving the drying to the touch and the fixation of the ink is incorporated into the core and a resin component, which permits resin particles to stably exist in the ink composition, is incorporated into the shell. According to a preferred embodiment of the present invention, the core comprises a resin having a crosslinked structure.

Materials for the core usable herein include styrene, tetrahydrofurfuryl acrylate and butyl methacrylate, ($\alpha$, 2, 3, or 4)-alkylstyrene, ($\alpha$, 2, 3, or 4)-alkoxystyrene, 3,4-dimethylstyrene, a-phenhylstyrene, divinylbenzene, vinylnaphthalene, dimethylamino (meth)acrylate, dimethylaminoethyl (meth)acrylate, dimethylaminopropylacrylamide, N,N-dimethylaminoethyl acrylate, acryloylmorphine, N,N-dimethylacrylamide, N-isopropylacrylamide, N,N-diethylacrylamide, methyl (meth)acrylate, ethyl (meth)acrylate, propyl (meth)acrylate, ethylhexyl (meth)acrylate, and other alkyl (meth)acrylates, methoxydiethylene glycol (meth)acrylate, (meth)acrylate of an ethyl, propyl, or butyl ester of diethylene glycol or polyethylene glycol, cyclohexyl (meth)acrylate, benzyl (meth)acrylate, .phenoxyethyl (meth)acrylate, isobornyl (meth)acrylate, hydroxyalkyl (meth)acrylate, and fluorine-, chlorine-, or silicon-containing (meth)acrylate, (meth)acrylamide, and maleic amide.

When a crosslinked structure is introduced in addition to the above (meth)acrylic acid, it is possible to use (mono, di, tri, tetra, or poly)ethylene glycol di(meth)acrylate, (meth)acrylates of 1,4-butanediol, 1,5-pentanediol, 1,6-hexanediol, 1,8-octanediol, and 1,10-decanediol, trimethylolpropane tri (meth)acrylate, glycerin (di or tri)(meth)acrylate, di(meth)acrylate of ethylene oxide adduct of bisphenol A or F, neopentyl glycol di(meth)acrylate, pentaerythritol tetra (meth)acrylate, and dipentaerythritol hexa(meth)acrylate.

For the formation of the shell, the same material as used in the formation of the core may be used.

Emulsifiers usable for the formation of the above polymeric fine particles include sodium laurylsulfate, potassium laurylsulfate, anionic surfactants, nonionic surfactants, and amphoteric surfactants, which are commonly used in the art.

Polymerization initiators usable herein include potassium persulfate, ammonium persulfate, hydrogen persulfate, azobisisobutyronitrile, benzoyl peroxide, dibutyl peroxide, peracetic acid, cumene hydroperoxide, t-butyl hydroxyperoxide, and p-menthane hydroxyperoxide.

Chain transfer agents usable for the polymerization include t-dodecylmercaptan, n-dodecylmercaptan, n-octylmercaptan, xanthogen compound, such as dimethylxanthogendisulfide or diisobutylxanthogendisulfide, dipentene, indene, 1,4-cyclohexadiene, dihydrofuran, and xanthen.

According to a preferred embodiment of the present invention, the core comprises an epoxy resin or a urethane resin with a resin having a crosslinked structure being more preferred. According to another preferred embodiment of the present invention, the core comprises an acrylic resin and/or a methacrylic resin with a resin having a crosslinked structure being more preferred. Preferably, the shell has a structure having a surface with a carboxyl group of an acryloyl group and/or a methacryloyl group. Further, preferably, the functional group on the surface of the shell has been treated with an ammonium salt or an organic alkali, such as amine and/or amide salts, from the viewpoint of allowing the resin particle to stably exist in the ink composition.

According to a preferred embodiment of the present invention, the molecular weight of the water-soluble emulsion is preferably not less than 1000, more preferably about 10,000 to 100,000.

The water-soluble emulsion used in the present invention may be a commercially available one, and examples thereof include Z116 manufactured by Mitsui Toatsu Chemicals, Inc.

The amount of the water-soluble emulsion added may be properly determined. For example, it is preferably about 0.5 to 10% by weight, more preferably about 3 to 5% by weight.

The ink composition of the present invention may contain, in addition to the above ingredients, other ingredients. Examples of other ingredients usable herein include nozzle clogging preventives, preservatives, antioxidants, electric conductivity adjustors, pH adjustors, viscosity modifiers, surface tension modifiers, and oxygen absorbers. Preservatives and fungicides usable herein include, for example, sodium benzoate, pentachlorophenol sodium, 2-pyridinethiol-1-oxide sodium, sodium sorbate, sodium dehydroacetate, 1,2-dibenzthiazolin-3-one (Proxel CRL, Proxel BDN, Proxel GXL, Proxel XL-2, and Proxel Tenn., manufactured by ICI).

Dye-containing Ink Composition

The second black ink composition in the present invention comprises a dye as a colorant.

The dye used in the present invention is not particularly limited. Preferred examples thereof include water-soluble acid dyes, direct dyes, basic dyes, and reactive dyes described in COLOR INDEX. The second ink composition in the present invention may be constituted by either a black ink or a color ink, or by both of them. The amount of the dye added is not particularly limited. Preferably, however, it is about 0.1 to 20% by weight based on the ink composition.

According to a preferred embodiment of the present invention, the dye-containing ink composition further comprises a component capable of agglomerating or thickening the pigment-containing ink composition. Examples of the component capable of agglomerating or thickening the pigment-containing ink composition include cationic materials, organic salts, and inorganic salts. A specific example of the cationic material usable herein is a compound having in its molecule a primary, secondary, tertiary, or quaternary amine, ammonium, phosphorus, or phosphonium. Specific examples of organic salts usable herein include polyallylamine salts and polyethyleneimine salts. Specific examples of inorganic salts usable herein include those wherein ions of metals of alkali metals, alkaline earth metals, aluminum, zinc, chromium, copper, nickel, and iron are used as cations. The amount of the above component added may be suitably determined. In general, however, it is preferably about 0.5 to 5% by weight.

According to a preferred embodiment of the present invention, the ink composition comprising a dye as the colorant further comprises a glycol ether. Addition of the glycol ether can enhance the penetration of the ink composition into the recording medium, and printing on various recording media without feathering or bleeding can be expected.

The glycol ether is preferably one member or a mixture of at least two members selected from among diethylene glycol mono-n-butyl ether, triethylene glycol mono-n-butyl ether, propylene glycol mono-n-butyl ether, and dipropylene glycol mono-n-butyl ether. The amount of the glycol ether added may be suitably determined. In general, however, it is preferably about 3 to 30% by weight, more preferably about 5 to 10% by weight. Some of the glycol ethers have low water solubility. According to a preferred embodiment of the present invention, addition of other highly water-soluble glycol ethers, diols and glycols, such as thioglycol, 1,4-butanediol, 1,5-pentanediol, and propylene glycol, or surfactant can improve the solubility.

According to another preferred embodiment of the present invention, the ink composition comprising a dye as the colorant further comprises an acetylene glycol surfactant. Addition of the acetylene glycol surfactant can enhance the penetration of the ink composition into the recording medium, and printing on various recording media without feathering or bleeding can be expected.

Examples of preferred acetylene glycol surfactants usable in the present invention include compounds represented by the following formula (I)

(I)

wherein $0 \leq m+n \leq 50$ and $R^1$, $R^2$, $R^3$, and $R^4$ each independently represent an alkyl group.

Among the compounds represented by the formula (I), 2,4,7,9-tetramethyl-5-decyn-4,7-diol, 3,6-dimethyl-4-octyne-3,6-diol, 3,5-dimethyl-1-hexyn-3-ol and the like are particularly preferred. Commercially available products may be used as the acetylene glycol surfactant represented by the formula (I), and specific examples thereof include Surfynol 104, 82, 465, 485, and TG, all of which are commercially available from Air Products and Chemicals, Inc. and Olfine STG and E1010, all of which are commercially available from Nissin Kagaku.

According to a preferred embodiment of the present invention, the amount of the acetylene glycol surfactant added is preferably 0.3 to 2% by weight, more preferably 0.5 to 1.5% by weight, based on the total amount of the ink. Addition of the acetylene glycol surfactant in an amount falling within the above range can realize an image suffering from less feathering or bleeding.

Some of the acetylene glycol surfactants, for example, Surfynol 104 and TG described above, have low HLB and hence have low water solubility. This solubility can be improved by adding an additive, such as a glycol ether, a glycol compound, or a surfactant, to the ink composition.

According to a preferred embodiment of the present invention, the dye-containing ink composition further comprises a polyhydric alcohol from the viewpoint of preventing nozzle clogging. Specific examples polyhydric alcohols usable herein include ethylene glycol, diethylene glycol, triethylene glycol, tetraethylene glycol, propylene glycol, dipropylene glycol, tripropylene glycol, polyethylene glycol having a molecular weight of not more than 2000, 1,3-propylene glycol, isopropylene glycol, isobutylene glycol, 1,4-butanediol, 1,3-butanediol, 1,5-pentanediol, 1,6-hexanediol, glycerine, thiodiglycol, mesoerythritol, and pentaerythritol. Among them, glycerin, 1,5-pentanediol, diethylene glycol, or thiodiglycol, and a mixture of these compounds are particularly preferred because they can properly regulate the viscosity of the ink composition, effectively prevent the clogging of the nozzle, and increase the cloud point of the ink composition. Further, they can. advantageously improve the solubility of the acetylene glycol surfactant (particularly Surfynol 104 and Surfynol TG) in the ink composition and, even when the ink composition is placed under high temperature conditions, can prevent phase separation of the ink composition. Although the amount of the polyhydric alcohol added may be properly determined, it is preferably about 1 to less than 30% by weight, more preferably about 5 to 15% by weight, based on the ink composition.

According to a preferred embodiment of the present invention, the dye-containing composition comprises a saccharide. Addition of the saccharide can effectively prevent clogging of the nozzle caused by drying of the ink composition at the front face of the nozzle. Saccharides usable herein include monosaccharides and polysaccharides. Examples thereof include glucose, mannose, fructose, ribose, xylose, arabinose, lactose, galactose, aldonic acid, glucitose, maltose, cellobiose, sucrose, trehalose, maltotriose, alginic acid and salts thereof, cyclodextrins, and celluloses. Although the amount of the saccharide added may be suitably determined, it is preferably about 0.05 to 10% by weight. According to a preferred embodiment of the present invention, in the case of glucose, mannose, fructose, ribose, xylose, arabinose, lactose, galactose, aldonic acid, glucitose, maltose, cellobiose, sucrose, trehalose, and maltotriose, the amount thereof is more preferably about 3 to 10% by weight. Alginic acid and salts thereof, cyclodextrins, and celluloses, when added to the ink composition, are likely to increase the viscosity of the ink composition, and, hence, preferably, care should be taken so as to avoid addition of these compounds in an excessive amount.

According to a preferred embodiment of the present invention, the dye-containing ink composition further comprises a water-soluble organic solvent. Examples of water-soluble organic solvents usable herein include: alkyl alcohols having 1 to 4 carbon atoms, such as ethanol, methanol, butanol, propanol, and isopropanol; glycol ethers, such as ethylene glycol monomethyl ether, ethylene glycol monoethyl ether, ethylene glycol monobutyl ether, ethylene glycol monomethyl ether acetate, diethylene glycol monomethyl ether, diethylene glycol monoethyl ether, diethylene glycol mono-n-propyl ether, ethylene glycol mono-iso-propyl ether, diethylene glycol mono-iso-propyl ether, ethylene glycol mono-n-butyl ether, ethylene glycol mono-t-butyl ether, diethylene glycol mono-n-butyl ether, triethylene glycol mono-n-butyl ether, diethylene glycol mono-t-butyl ether, 1-methyl-1-methoxybutanol, propyleneglycol monomethyl ether, propylene glycol monoethyl ether, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol monomethyl ether, dipropylene glycol monoethyl ether, dipropylene glycol mono-n-propyl ether, and dipropylene glycol mono-iso-propyl ether; formamide; acetamide; dimethyl sulfoxide; sorbit; sorbitan; acetin; diacetin; triacetin; and sulfolane. These water-soluble organic solvents can advantageously improve the solubility of other ingredients into the ink composition, can improve the penetration of the ink composition into a recording medium, for example, paper, and, in addition, can effectively prevent clogging of the nozzle, and, hence, addition thereof is preferred. Although the amount of the organic solvent added may be properly determined, it is preferably about 0.1 to 60% by weight, more preferably about 5 to 15% by weight, based on the ink composition.

Further, a surfactant may be added to the ink composition according to the present invention from the viewpoint of regulating the penetration of the ink into a recording medium. Preferred surfactants which may be added to the ink composition are those having good compatibility with other ingredients of the ink composition. Examples of surfactants usable herein include amphoteric surfactants and nonionic surfactants. Examples of amphoteric surfactants usable herein include lauryldimethylaminoacetic acid betaine, 2-alkyl-N-carboxymethyl-N-hydroxyethylimidazolinium betaine, coconut oil fatty acid amide propyldimethylaminoacetic acid betaine, polyoctylpolyaminoethylglycine, and imidazoline derivatives. Examples of nonionic surfactants usable herein include ether surfactants, such as polyoxyethylene nonylphenyl ether, polyoxyethylens octylphenyl ether, polyoxyethylene dodecylphenyl ether, polyoxyethylene alkylallyl ether, polyoxyethylene oleyl ether, polyoxyethylene lauryl ether, polyoxyethylene alkyl ether, and polyoxyalkylene alkyl ether, polyoxyethyleneoleic acid, ester surfactants, such as polyoxyethyleneoleic ester, polyoxyethylenedistearic ester, sorbitan laurate, sorbitan monostearate, sorbitan monooleate, sorbitan sesquioleate, polyoxyethylene monooleate, and polyoxyethylene stearate, and fluorosurfactants, such as fluoroalkyl esters and salts of perfluoroalkylcarboxylic acids.

The ink composition of the present invention may contain, in addition to the above ingredients, other ingredients. Examples of other ingredients usable herein include nozzle clogging preventives, preservatives, antioxidants, electric conductivity adjustors, pH adjustors, viscosity modifiers, surface tension modifiers, and oxygen absorbers. Preservatives and fungicides usable herein include, for example, sodium benzoate, pentachlorophenol sodium, 2-pyridinethiol-1-oxide sodium, sodium sorbate, sodium dehydroacetate, 1,2-dibenzthiazolin-3-one (Proxel CRL, Proxel BDN, Proxel GXL, Proxel XL-2, and Proxel Tenn., manufactured by ICI).

pH adjustors, solubilizers, and antioxidants usable herein include: amines, such as diethanolamine, triethanolamine, propanolamine, and morpholine, and modification products thereof; inorganic salts, such as potassium hydroxide, sodium hydroxide, and lithium hydroxide; ammonium hydroxide; quaternary ammonium hydroxide, such as tetramethylammonium; salts of carbonic acid, such as potassium carbonate, sodium carbonate, and lithium carbonate; salts of carbonic acid, such as potassium phosphate, sodium phosphate, and lithium phosphate, and salts of phosphoric acid; N-methyl-2-pyrrolidone; urea compounds, such as urea, thiourea, and tetramethylurea; allophanate compounds, such as allophanate and methyl allophanate; biuret compounds, such as biuret, dimethylbiuret, and tetramethylbiuret; and L-ascorbic acid and salts thereof.

The ink composition according to the present invention may further comprise an antioxidant and an ultraviolet absorber, and examples thereof include Tinuvin 328, 900, 1130, 384, 292, 123, 144, 622, 770, and 292, Irgacor 252 and 153, and Irganox 1010, 1076, 1035, and MD1024, manufactured by Ciba-Geigy, and lanthanide oxides.

Ink jet Recording Method and Apparatus

According to the ink jet recording method of the present invention, when the recording medium comprises a gloss layer and/or an ink-receptive layer, only the black ink composition comprising a dye as the colorant is printed on the recording medium, while when the recording medium is plain paper, both the black ink composition comprising a pigment as the colorant and the black ink composition comprising a dye as the colorant are printed on the medium.

In the case of a specialty recording medium for ink jet recording, a good image can be realized using the ink composition comprising a dye as the colorant. In addition, according to the present invention, color development of a black image on plain paper can be mainly realized by the black ink composition comprising a pigment as the colorant. Therefore, for printing on plain paper, the concentration of the dye in the dye-containing black ink composition may be relatively low. Further, the black ink composition comprising a dye as the colorant, even when the dye concentration is low, can develop good black color on a recording medium having a gloss layer and/or an ink-receptive layer. Thus, the concentration of the dye in the dye-containing black ink composition can be lowered, and the occurrence of a granular spot observed in the realization of an image having quality, comparable to a photograph, on a specialty paper can be prevented, making it possible to realize very good image quality.

On the other hand, in the case of plain paper, the dye-containing ink composition is printed before or after printing of the pigment-containing ink composition on the recording medium. Upon contact of the above two ink compositions with each other, the pigment-containing ink composition is agglomerated or thickened to prevent feathering or color bleeding, realizing a good image. Overprinting of the above two ink compositions with each other on plain paper can provide a black image having high print density. According to a preferred embodiment of the present invention, the black ink composition comprising a dye as the colorant is first printed followed by printing of the black ink composition comprising a pigment as the colorant. Further, according to a preferred embodiment of the present invention, a halftone black image can be realized. Specifically, high print quality, especially print quality comparable to the quality of a photograph, can be realized by printing only a black ink composition comprising a dye as the colorant on areas where the black density should be low and, in addition, overprinting the two black ink compositions on areas where the black density should be high. In this case, it is a matter of course that a color ink is separately provided and a color image may be formed on the plain paper. According to a preferred embodiment of the present invention, the dye-containing ink composition of the present invention is a black ink and used in combination with color inks as other ink compositions (for example, yellow, magenta, and cyan inks).

Further, according to another embodiment of the present invention, an ink Composition comprising a component capable of agglomerating or thickening the pigment-containing ink composition may be provided as the color ink. According to this embodiment, bleeding between the black ink and the color ink can be effectively prevented.

Figure 1:
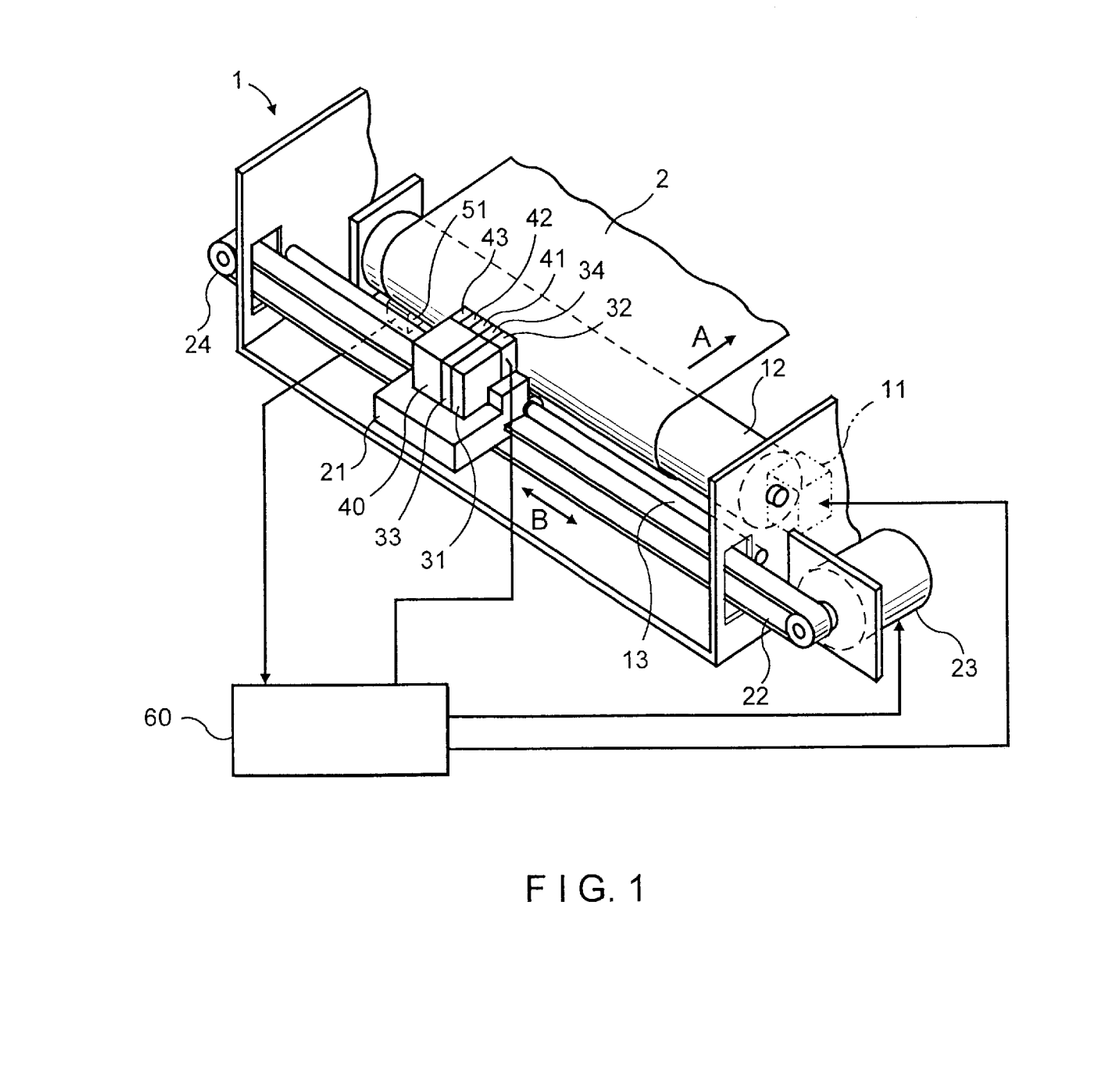
FIG. 1 is a diagram showing an ink jet recording apparatus for carrying out the ink jet recording method according to the present invention.

An apparatus for carrying out ink jet recording according to the present invention will be described with reference to the accompanying drawing. FIG. 1 is a schematic diagram showing the construction of an apparatus for ink jet recording according to a preferred embodiment of the present invention. A printer 1 comprises a sheet feeding motor 11 and a platen roller 12, linked with the sheet feeding motor 11, as recording medium carrying means for holding and carrying a recording medium 2 in a direction indicated by an arrow A in the drawing. The printer 1 further comprises a carriage 21 loaded with the following elements: a pigment-containing ink composition tank 31; a recording head 32 as printing means for ejecting the pigment-containing ink composition; a dye-containing ink composition tank 33; a recording head 34 as printing means for ejecting the dye-containing ink composition; an ink tank 40 for an yellow ink, a magenta ink, and a cyan ink; and recording heads 41, 42 and 43 as ink composition printing means for ejecting the yellow ink, magenta ink, and cyan ink compositions. The carriage 21 is constructed so that it can be slid on a sliding shaft 13 provided parallel to the shaft of the platen roller 12 and reciprocated in a direction indicated by an arrow B in the drawing. The carriage 21 is connected to a carriage belt 22 which is installed on a carriage motor 23 and a pulley 24. Rotation of the motor 23 permits the carriage 21 to be reciprocated. The printer 1 further comprises a sensor 51 for detecting whether the recording medium 2 is plain paper or a recording medium having a gloss layer and/or an ink-receptive layer. The paper feed motor 11, the carriage motor 23, the recording heads 32, 34, 41, 42, and 43, and the sensor 51 are coupled to and controlled by a control circuit 60.

As soon as the control circuit 60 receives, from the sensor 51, a signal indicating that the recording medium 1 is a recording medium having a gloss layer and/or an ink-receptive layer, printing is carried out in such a manner that the dye-oontaining ink composition is ejected from the recording head 34 and, optionally, the yellow, magenta, and cyan inks are ejected from the recording heads 41, 42, and 43 as the ink composition printing means respectively for ejecting the yellow, magenta, and cyan inks. In this case, the recording head 32 as the printing means for ejecting the pigment-containing ink composition does not operate. On the other hand, as soon as the control circuit 60 receives, from the sensor 51, a signal indicating that the recording medium 1 is plain paper, printing is carried out in such a manner that the dye-containing ink composition is ejected from the recording head 34 and, in addition, the pigment-containing ink composition is ejected from the recording head 32 so that the two ink compositions are overprinted with each other. In this printing, if necessary, the yellow, magenta, and cyan inks may be ejected from the recording heads 41, 42, and 43 as the ink composition printing means respectively for ejecting the yellow, magenta, and cyan inks.

An ink, comprising a pigment as the colorant, having a relatively high content of a solid, like the ink composition of the present invention, when placed in a nozzle without ejection for a long period of time, is likely to dry at the front face of the nozzle to cause thickening, leading to an ink droplet trajectory directionality problem. In this case, slightly moving the ink with care not to cause the ink to be delivered from the front face of the nozzle can stir the ink, permitting the ink to be stably ejected. This can be achieved by pressurizing the ink, by means of pressurizing means for ejecting the ink, with care not to cause the ink to be ejected. In the above regulation, use of an electrostrictive element as the pressurizing means is preferred from the viewpoint of easy regulation. Utilization of this mechanism can increase the content of the pigment in the ink, permitting a high color density to be provided using a pigment-based ink and, in addition, the ink to be stably ejected.

When the above slight moving of the ink is carried out in the nozzle face of an ink jet recording apparatus, this operation is effective for an ink composition having a pigment content of about 5 to 15% by weight, more preferably about 7 to 10% by weight.

In use, the ink composition of the present invention may be filled into an ink tank constructed so that a polyurethane foam is provided therein and the ink comes into contact with the polyurethane foam. In this case, the glycol ether compound, which is preferably used in the present invention, and the acetylene glycol surfactant used in the present invention are adsorbed onto the polyurethane foam. Therefore, preferably, they are added in an excessive amount in consideration of the adsorption. Further, the polyurethane foam can ensure a negative pressure by using the ink composition of the present invention and is less likely to be decomposed by ingredients of the ink used in the present invention, or to create a deposit causative of clogging of the nozzle. A polyurethane foam not using a curing catalyst containing a metal salt or a cationic material is preferred. Specifically, use of a polyurethane foam comprising a polyfunctional isocyanate, such as tolylene diisocyanate or m-xylene diisocyanate, and a material having a plurality of hydroxyl groups, such as a glycol compound having an average molecular weight of about 300 to 3000, such as polypropylene glycol or polyethylene glycol, glycerin, pentaerythritol, dipentaerythritol, neopentyl glycol, propylene glycol, 1,3-butanediol, 1,4-butanediol, or 1,5-pentanediol, is preferred from the viewpoint of ensuring negative pressure, by virtue of the stability of foam shape, and chemical stability.

EXAMPLE

Preparation of Ink Compositions

Ink compositions comprising ingredients specified in the following table were prepared by a conventional method.

TABLE 1

|  | Ink set 1 | | | | | Ink set 2 | | | | | Ink set 3 | | | | |
| --- | --- | --- | --- | --- | --- | --- | --- | --- | --- | --- | --- | --- | --- | --- | --- |
|  | Pigment BK | Dye Bk | Y | M | C | Pigment Bk | Dye Bk | Y | M | C | Pigment Bk | Dye Bk | Y | M | C |
| Surface-treated pigment (129 nm) | 3.5 | | | | | | | | | | | | | | |
| Surface-treated pigment (140 nm) | | | | | | 3 | | | | | | | | | |
| Surface-treated pigment (60 nm) | | | | | | | | | | | 4.5 | | | | |
| C.I. Direct Black 154 | | 2.5 | | | | | | | | | | | | | |
| C.I. Direct Black 168 | | | | | | | 3 | | | | | | | | |
| C.I. Sulfur Black 1 | | | | | | | | | | | | 4 | | | |
| C.I. Direct Yellow 86 | | | 2 | | | | | | | | | | | | |
| C.I. Direct Yellow 132 | | | | | | | | 2.5 | | | | | | | |
| C.I. Acid Yellow 23 | | | | | | | | | | | | | 3 | | |
| C.I. Acid Red 52 | | | | 2 | | | | | | | | | | | |
| C.I. Acid Red 254 | | | | | | | | | 2.5 | | | | | | |
| C.I. Reactive Red 180 | | | | | | | | | | | | | | 3.5 | |
| C.I. Direct Blue 199 | | | | | 2.5 | | | | | | | | | | 1.5 |
| C.I. Acid Blue 9 | | | | | | | | | | 2 | | | | | 2.5 |
| Diethylene glycol monobutyl ether | | 8 | 8 | 8 | 8 | | | | | | | 8 | 8 | 8 | 8 |
| Triethylene glycol monobutyl ether | | | | | | | 7 | 7 | 7 | 7 | | | | | |
| Olfine STC | | 0.8 | 0.8 | 1 | 0.9 | | | | | | | | | | |
| Olfine E1010 | | | | | | | 1 | 1 | 0.8 | 0.7 | | 1.6 | 1.6 | 1.6 | 1.6 |
| Glycerin | 10 | 10 | | 8 | 15 | 7 | 10 | 6 | | 8 | 5 | 5 | 10 | 13 | 16 |
| Diethylene glycol | | | 20 | 8 | | | 10 | 5 | 21 | 7 | 5 | 10 | 10 | 5 | 8 |
| 2-pyrrolidone | 5 | 5 | | | | 8 | | | | | 5 | 5 | | | |
| Urea | | | | 8 | | | 5 | | | | | | | 4 | |
| Danfix 723* | 1 | 1 | 1 | 1 | 1 | | | | | | | | | | |
| PAS-M-1** | | | | | | | 2 | 2 | 2 | 2 | | | | | |
| Magnesium nitrate | | | | | | | | | | | | | 5 | 5 | 5 |
| Ethanol | 4 | | | | | | | | | | 4 | | | | |
| Triethanolamine | 0.9 | | | | | 0.9 | 0.9 | 0.9 | 0.9 | 0.9 | 1.5 | 0.9 | 0.9 | 0.9 | 0.9 |
| Potassium hydroxide | 0.1 | | | | | 0.1 | 0.2 | 0.2 | 0.2 | 0.4 | 0.2 | 0.2 | 0.2 | 0.1 | 0.2 |
| Almatex Z116*** | | | | | | 1.5 | | | | | 2.0 | | | | |
| Pure water | Balance | Balance | Balance | Balance | Balance | Balance | Balance | Balance | Balance | Balance | Balance | Balance | Balance | Balance | Balance |
| Total | 100 | 100 | 100 | 100 | 100 | 100 | 100 | 100 | 100 | 100 | 100 | 100 | 100 | 100 | 100 |

*, **: polyallylamine, tradenames of Nitto Boseki Co., Ltd.
***: water-soluble emulson manufactured by Mitsui Toatsu Chemicals, Inc.

In the table, all numerical values are in wt %, and the surface-treated pigment is Microjet CW1, manufactured by Orient Chemical Industries, Ltd., or a water-soluble pigment prepared by treating a commercially available pigment according to a method described in Japanese Patent Laid-Open No. 34981/1996. Further, the average particle diameter in nm of the water-soluble pigment was as indicated in parentheses.

Print Evaluation Test

The ink compositions were filled into an ink jet printer MJ-930C manufactured by Seiko Epson Corporation, and an image was printed on recording media. The ink compositions were used in combination as specified in the following table. Further, in the following table, the undercoat printing refers to that, when the recording medium is gloss papers A to C, printing of the ink composition specified in the table has been carried out before printing of the pigment-containing black ink composition.

TABLE 2

|  | Ink Set | Undercoat printing |
| --- | --- | --- |
| Example 1 | Ink Set 1 | Dye black ink |
| Example 2 | Ink Set 2 | Dye black ink |
| Example 3 | Ink Set 3 | Magenta ink, cyan ink |
| Comparative Example 1 | Ink Set 3 (black ink being pigment BK only) | None |
| Comparative Example 2 | Ink Set 3 (black ink being dye BK only) | None |

The recording media used were Conqueror paper, Modo Copy paper, Rapid Copy paper, Xerox 4024 paper, Neenah Bond paper, Xerox P paper, Xerox R paper, and gloss paper A (a microporous, ink-absorptive recording medium prepared by coating a silica sol onto a polyester sheet), gloss paper B (a recording medium prepared by coating a resin onto a polyester sheet, this recording medium being swollen with an ink), and gloss paper C (a recording medium prepared by coating a colloidal silica having an average particle diameter of 500 nm, onto paper, using a latex as a binder).

The printed images were evaluated for fast drying, print quality, rubbing/scratch resistance, and waterfastness by the following methods.

Fast Drying

Black letters having a size of 50 points were printed on the above seven plain papers as recording media. After the printing, on the printed plain paper was put the same type of plain paper, and the time taken for the paper put on the printed paper to no longer be smeared was measured at intervals of 5 sec. The measurements were averaged. The results were evaluated according to the following criteria.

A: not more than 10 seconds

B: more than 10 seconds to not more than 20 seconds

C: more than 20 seconds to not more than 30 seconds

D: more than 30 seconds

Print Quality

Black letters having a size of 50 points and color images using the ink set were printed on the seven plain papers and the three gloss papers. After drying, feathering and color bleeding in the prints were evaluated according to the following criteria.

A: Feathering and color bleeding were hardly observed, and the printed color image was sharp.

B: Feathering and color bleeding were somewhat observed, and the printed color image was somewhat blurry with the level of the blurring being still practically acceptable.

C: Feathering and color bleeding were observed, and the printed color image was blurry to an unacceptable extent.

D: The image density was low, and the printed color image was considerably blurry, so that the volume of the image was very poor.

Rubbing/Scratch Resistance

Black letters having a size of 50 points were printed on the seven plain papers and the three gloss papers. The print after drying was rubbed with an aqueous fluorescent marker pen (yellow) (ZEBRA PEN2, manufactured by Zebra Co., Ltd.), and the smearing of the print was inspected.

The results were evaluated according to the following criteria. In the following table, the worst grades of the results among the plain papers and the gloss papers.

A: The color was not lost by rubbing a plurality of times.

B: The color was not lost by rubbing once.

C: The color was somewhat lost by rubbing once.

D: The color was lost by rubbing once.

Waterfastness

Black letters having a size of 50 points were printed on the seven plain papers and the three gloss papers. Pure water was dropped onto the print after drying, and one min after the dropping of the pure water, the trace of the water droplet was inspected.

The results were evaluated according to the following criteria. In the following table, the worst grades of the results among the plain papers and the gloss papers.

A: No trace was observed.

B: Substantially no trace was observed.

C: Some trace was observed.

D: Considerably clear trace was observed.

The results are summarized in the following table.

TABLE 3

|  |  |  | Example | | | Comparative Example | |
| --- | --- | --- | --- | --- | --- | --- | --- |
|  |  |  | 1 | 2 | 3 | 1 | 2 |
| A. Fast drying | Plain paper |  | A | A | A | B | A |
| B. Print quality | Plain paper | CONQUEROR | A | A | B | A | C |
|  |  | MODO COPY | A | A | B | A | C |
|  |  | RAPID COPY | A | A | B | A | C |
|  |  | XEROX 4024 | A | A | B | A | C |
|  |  | NEENAH BOND | A | A | B | A | C |
|  |  | Xerox P | A | A | B | A | C |
|  |  | Xerox R | A | A | B | A | C |
|  | Gloss paper A |  | A | A | A | D | A |
|  | Gloss paper B |  | A | A | A | D | A |
|  | Gloss paper C |  | A | A | A | D | A |
| C. Scratch resistance | Plain paper |  | A | A | A | A | A |
|  | Gloss paper |  | A | A | A | D | A |
| D. Waterfastness | Plain paper |  | B | A | B | A | D |
|  | Gloss paper |  | A | A | A | A | A |

What is claimed is:

1. An ink jet recording method comprising (a) providing a first black ink composition comprising a pigment as a colorant;

(b) providing a second black ink composition comprising a dye as a colorant;

(c) providing a recording medium that either (i) is plain paper or (ii) comprises a gloss layer, an ink receptive layer or both; and (d) forming print on the recording medium with either the first black ink composition or the second black ink composition or both, wherein (i) when the recording medium comprises the gloss layer, the ink-receptive layer or both, only the second black ink composition comprising the dye as the colorant is printed on the recording medium and (ii) when the recording medium is plain paper, both the first black ink composition comprising the pigment as the colorant and the second black ink composition comprising the dye as the colorant arc printed on the recording medium.

2. The ink jet recording method according to claim 1, wherein the pigment is dispersible or soluble in water without a dispersant.

3. The ink jet recording method according to claim 1, wherein the pigment is composed mainly of carbon black and has been treated so that at least one functional group, selected from carbonyl, carboxyl, hydroxyl, and sulfone groups, or a salt thereof is bonded to the surface of the pigment, thereby permitting the pigment to be dispersible or soluble in water without a dispersant.

4. The ink jet recording method according to claim 1, wherein the pigment has an average particle diameter of 50 to 200 nm.

5. The ink jet recording method according to claim 1, wherein the first black ink composition comprising the pigment as the colorant further comprises glycerin.

6. The ink jet recording method according to claim 1, wherein the first black ink composition comprising the pigment as the colorant further comprises a water-soluble emulsion.

7. The ink jet recording method according to claim 6, wherein the water-soluble emulsion contains a resin composed mainly of acrylic acid or methacrylic acid or a mixture thereof.

8. The ink jet recording method according to claim 6, wherein the water-soluble emulsion contains a resin particle having a core-shell structure comprising a core and a shell surrounding the core.

9. The ink jet recording method according to claim 8, wherein the core comprises at least one resin selected from the group consisting of opoxy resin, a urethane resin, an acrylic resin and a methacrylic resin and the shell comprises a resin having a surface with a carboxyl group of an acryloyl group or a methacryloyl group.

10. The ink jet recording method according to claim 8, wherein the resin constituting the core has a crosslinked structure.

11. The ink jet recording method according to claim 1, wherein the second black ink composition comprising the dye as the colorant further comprises a glycol ether compound.

12. The ink jet recording method according to claim 1, wherein the second black ink composition comprising the dye as the colorant further comprises a component capable of agglomerating or thickening the first black ink composition comprising the pigment as the colorant.

13. The ink jet recording method according to claim 1, wherein the component capable of agglomerating or thickening the first black ink composition comprising the pigment as the colorant is a cationic material, an organic salt, or an inorganic salt.

14. The ink jet recording method according to claim 1, wherein the recording medium is plain paper and the second black ink composition comprising the dye as the colorant is first printed on the recording medium followed by printing on the recording medium of the first black ink composition comprising the pigment as the colorant.

15. An ink set for the ink jet recording method according to claim 1, comprising the first black ink composition comprising the pigment as the colorant; and the second black ink composition comprising the dye as the colorant.

16. The ink set according to claim 15, which further comprises a color ink composition.

17. The ink jet recording method according to claim 1, wherein the first black ink composition comprising the pigment as the colorant further comprises 2-pyrrolidone.

18. The ink jet recording method according to claim 1, wherein the second ink composition comprising the dye as the colorant further comprises an acetylene glycol surfactant.

19. An ink jet recording apparatus comprising:
(a) a first black ink composition comprising a pigment as a colorant;
(b) a second black ink composition comprising a dye as a colorant;
(c) printing means for ejecting droplets of the first black ink composition, the second black ink composition or both and for depositing the droplets onto a recording medium;
(d) recording medium carrying means for holding and carrying the recording medium;
(e) means for judging whether the recording medium is plain paper or comprises a gloss layer, an ink-receptive layer or both; and
(f) function means which, when the recording medium comprises a gloss layer, an ink-receptive layer or both, permits only the black ink composition comprising the dye as the colorant to be printed on the recording medium and, when the recording medium is plain paper, permits both the first black ink composition comprising the pigment as the colorant and the second black ink composition comprising the dye as the colorant to be printed on the recording medium.

20. An ink jet recording method comprising the steps of:
(a) providing a first black ink composition comprising a pigment as a colorant;
(b) providing a second black ink composition comprising a dye as a colorant;
(c) providing a recording medium;
(d) determining whether the recording medium (i) is plain paper or (ii) comprises a gloss layer, an ink receptive layer or both
(e) forming print on the recording medium with (i) the first black ink composition but not the second black ink composition if it is determined in step (d) that the recording medium is plain paper or (ii) both the first black ink composition and the second black ink composition if it is determined in step (d) that the recording medium comprises the gloss layer, the ink-receptive layer or both.

* * * * *